US008909300B2

(12) United States Patent
Senoo

(10) Patent No.: US 8,909,300 B2
(45) Date of Patent: Dec. 9, 2014

(54) MOBILE TERMINAL AND CONTROLLING METHOD OF DISPLAYING DIRECTION

(71) Applicant: KYOCERA Corporation, Kyoto-shi, Kyoto (JP)

(72) Inventor: Hidemitsu Senoo, Katano (JP)

(73) Assignee: KYOCERA Corporation, Kyoto (JP)

( * ) Notice: Subject to any disclaimer, the term of this patent is extended or adjusted under 35 U.S.C. 154(b) by 66 days.

(21) Appl. No.: 13/682,887

(22) Filed: Nov. 21, 2012

(65) Prior Publication Data

US 2013/0137483 A1 May 30, 2013

(30) Foreign Application Priority Data

Nov. 25, 2011 (JP) .................................. 2011-257031

(51) Int. Cl.
| | |
|---|---|
| *H04M 1/00* | (2006.01) |
| *G09G 5/00* | (2006.01) |
| *H04M 1/02* | (2006.01) |
| *G06F 3/01* | (2006.01) |
| *G06F 1/32* | (2006.01) |

(52) U.S. Cl.
CPC ............... *G09G 5/00* (2013.01); *Y02B 60/1242* (2013.01); *G09G 2340/0492* (2013.01); *H04M 1/0264* (2013.01); *G06F 3/012* (2013.01); *H04M 2250/52* (2013.01); *G06F 1/3265* (2013.01); *G09G 2354/00* (2013.01)
USPC ....................... 455/566; 455/556.1; 455/550.1

(58) Field of Classification Search
CPC ... G09G 5/00; H04M 1/0264; H04M 2250/52

USPC ............ 455/556.1, 575.1–575.9, 566, 556.2; 379/433.13, 433.04
See application file for complete search history.

(56) References Cited

U.S. PATENT DOCUMENTS

| | | | | |
|---|---|---|---|---|
| 7,864,198 | B2 * | 1/2011 | Moroto et al. ................. | 345/629 |
| 8,619,172 | B2 * | 12/2013 | Senatori .................... | 348/333.01 |
| 2001/0055414 | A1 * | 12/2001 | Thieme ......................... | 382/135 |
| 2009/0245693 | A1 * | 10/2009 | Steinberg et al. ............. | 382/296 |
| 2013/0076964 | A1 * | 3/2013 | Sirpal et al. ............. | 348/333.12 |
| 2013/0106843 | A1 * | 5/2013 | Noda ............................ | 345/419 |
| 2014/0062858 | A1 * | 3/2014 | Yasumoto ..................... | 345/156 |

FOREIGN PATENT DOCUMENTS

JP 2008-131616 A 6/2008

* cited by examiner

*Primary Examiner* — Sharad Rampuria
(74) *Attorney, Agent, or Firm* — Procopio, Cory, Hargreaves & Savitch LLP

(57) ABSTRACT

A mobile phone (10) includes a display (14), an acceleration sensor (54), etc., and a displaying direction of the display (14) is set based on an inclination detected by the acceleration sensor. If the mobile phone (10) is rendered in a horizontal posture or approximately horizontal posture, an image imaged by a first camera module (50) is output so as to be subjected to face detection processing. If a face of a user is detected from the imaged image, a direction of the face is detected. When the face direction is detected, the displaying direction of the display (14) is set based on the face direction. An image is displayed on the display (14) in a displaying direction being set based on the direction of the face of the user.

19 Claims, 9 Drawing Sheets

FIG. 6
(A) 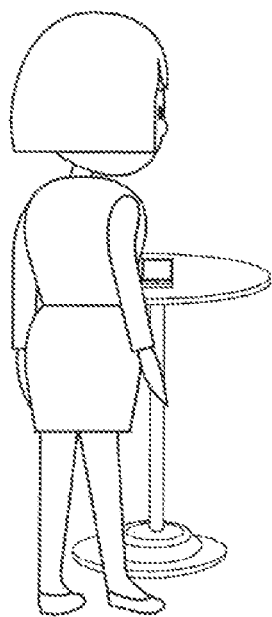 (B) 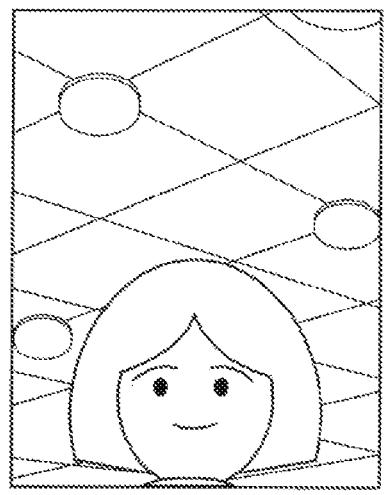
FIG. 7
(A) 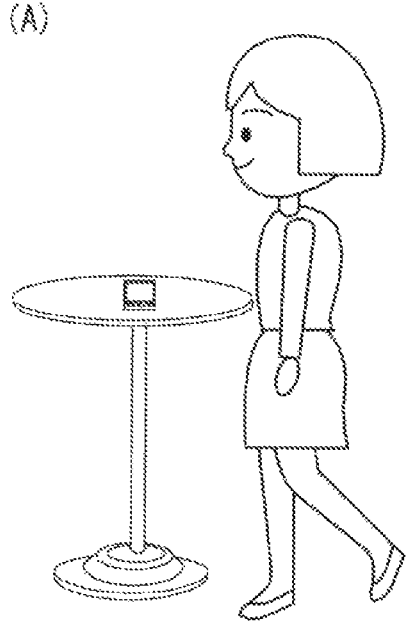 (B) 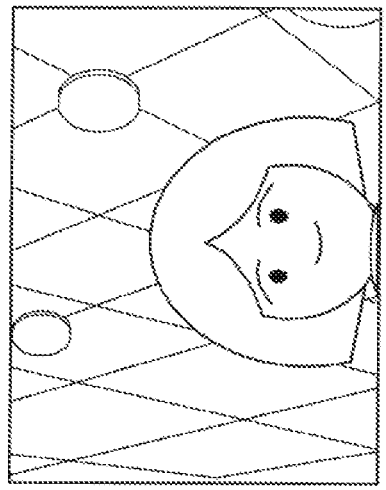

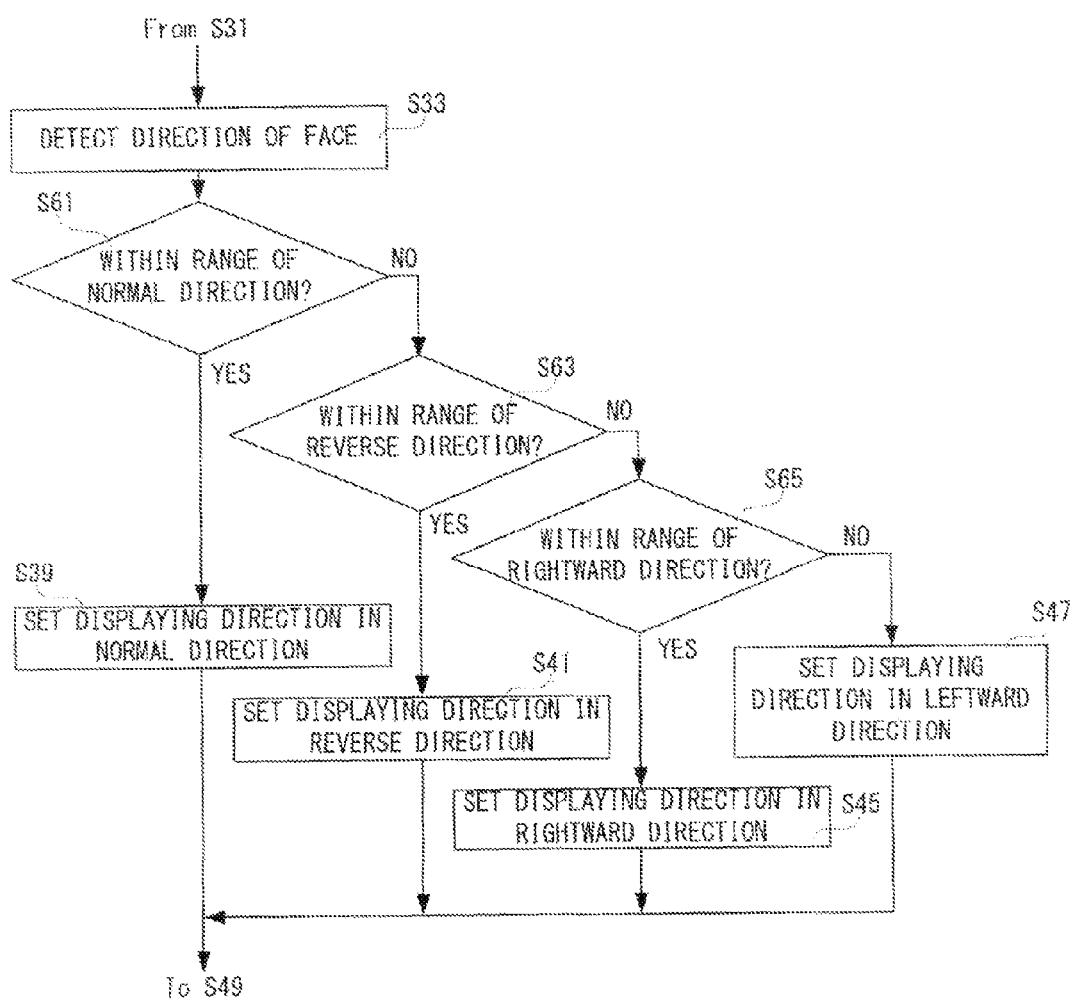

MOBILE TERMINAL AND CONTROLLING METHOD OF DISPLAYING DIRECTION

CROSS REFERENCE OF RELATED APPLICATION

The disclosure of Japanese Patent Application No. 2011-257031 is incorporated herein by reference.

BACKGROUND OF THE INVENTION

1. Field of the Invention

The present invention relates to a mobile terminal and a controlling method of a displaying direction, and more specifically a mobile terminal that the displaying direction of a display is changed, and a controlling method of a displaying direction.

2. Description of the Related Art

An example of a mobile terminal in which a displaying direction is changed is disclosed in Japanese Patent Application Laying-Open No. 2008-131616 [H04M 1/00, H04M 1/725, H04Q 7/38, H04Q 7/32] laid-open on Jun. 5, 2008. A mobile terminal device in this related art comprises a display, an acceleration sensor portion, etc., and based on a rotating direction and a rotating angle of the mobile terminal device, being output from the acceleration sensor portion, a displaying direction of a content is automatically rotated so as to be matched with a displaying screen of the display.

SUMMARY OF THE INVENTION

Therefore, it is a primary object of the present invention to provide a novel mobile terminal and a controlling method of a displaying direction.

Another object of the present invention is to provide a mobile terminal and a controlling method of a displaying direction, in that a displaying on a display is easy to be watched.

The present invention employs following features in order to solve the above-described problems. It should be noted that reference numerals and the supplements inside the parentheses show an example of a corresponding relationship with the embodiments described later for easy understanding of the present invention, and do not limit the present invention.

A first aspect according to the present invention is a mobile terminal having a display portion which displays a content and a detecting portion which detects a posture of the mobile terminal, and a displaying direction of the display portion is changed according to an inclination of the mobile terminal detected by the detecting portion, comprising: a camera module which outputs an imaged image; an activating portion which activates the camera module when a horizontal posture or approximately horizontal posture of the mobile terminal is detected by the detecting portion; a performing portion which performs face detection processing through which a face is detected from the imaged image output from the camera module being activated by the activating portion; a direction detecting portion which detects a direction of the face detected through the face detection processing; a setting portion which sets a displaying direction of the display portion based on the direction of the face detected by the direction detecting portion; and a displaying processing portion which displays a content on the display portion in accordance with the displaying direction set by the setting portion.

A second aspect according to the present invention is a controlling method of a displaying direction in a mobile terminal having a display portion which displays a content, a detecting portion which detects a posture of the mobile terminal and a camera module which outputs an imaged image, and a displaying direction of the display portion is changed according to an inclination of the mobile terminal detected by the detecting portion, comprising steps of: activating the camera module when a horizontal posture or approximately horizontal posture of the mobile terminal is detected by the detecting portion; performing face detection processing through which a face is detected from the imaged image output from the camera module being activated; detecting a direction of the face detected through the face detection processing; and setting a displaying direction of the display portion based on the direction of the face being detected.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 are appearance views showing a mobile phone of an embodiment according to the present invention, wherein FIG. 1(A) is an appearance view showing a top surface of the mobile phone, and FIG. 1(B) is an appearance view showing a bottom surface of the mobile phone.

FIG. 3 are illustrative views showing examples of images displayed on a display shown in FIG. 1, wherein FIG. 3(A) shows a displaying example of the display in a state that the mobile phone is held in a vertical direction, and FIG. 3(B) shows a displaying example of the display in a state that the mobile phone is held in a horizontal direction.

FIG. 4 are illustrative views showing displaying directions of the display shown in FIG. 1, wherein FIG. 4(A) shows a displaying example in a case that a displaying direction is a normal direction, FIG. 4(B) shows a displaying example in a case that a displaying direction is a reverse direction, FIG. 4(C) shows a displaying example in a case that a displaying direction is a rightward direction, and FIG. 4(D) shows a displaying example in a case that a displaying direction is a leftward direction.

FIG. 5 are illustrative views showing portions of an imaged image output from a first camera module shown in FIG. 2, wherein FIG. 5(A) shows an imaged image being divided into an upper portion and a lower portion, and FIG. 5(B) shows an imaged image being divided into a left portion and a right portion.

FIG. 6 are illustrative views showing an example of a face of a user imaged at a time that the mobile phone shown in FIG. 1 is put on a desk, wherein FIG. 6(A) shows an example of a positional relationship between the mobile phone being put on the desk and the user, and FIG. 6(B) shows an example of the face of the user that is imaged in a state of FIG. 6(A).

FIG. 7 are illustrative views showing another example of a face of a user imaged at a time that the mobile phone shown in FIG. 1 is put on a desk, wherein FIG. 7(A) shows an example of a positional relationship between the mobile phone being put on the desk and the user, and FIG. 7(B) shows an example of the face of the user that is imaged in a state of FIG. 7(A).

FIG. 13 are illustrative views showing an example of procedure detecting a direction of a face from an imaged image output from the first camera module shown in FIG. 2, wherein FIG. 13(A) shows an example of a face of the user imaged, FIG. 13(B) shows an example of a face region extracted from the imaged image shown in FIG. 13(A), and FIG. 13(C) shows a direction of the face detected from an extracted image shown in FIG. 13(B).

FIG. 14 is a flowchart showing an example of a part of a displaying direction setting process by the processor shown in FIG. 2 in accordance with a second embodiment.

DETAILED DESCRIPTION OF THE PREFERRED EMBODIMENTS

First Embodiment

Figure 1:
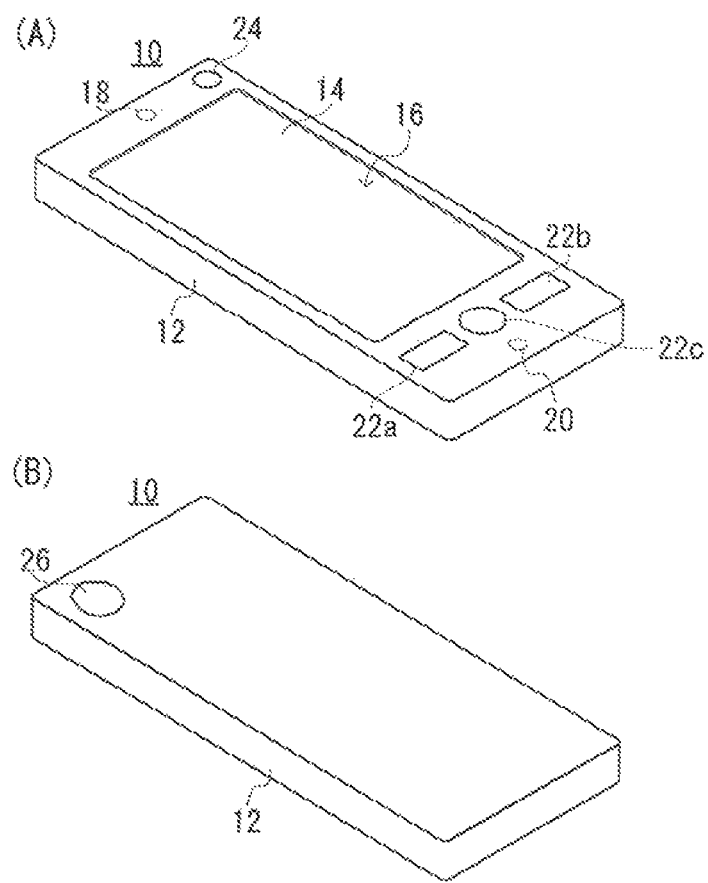

With referring to FIGS. 1(A) and 1(B), a mobile phone 10 of an embodiment according to the present invention is a smartphone as an example, and includes a longitudinal flat rectangular housing 12. However, it is pointed in advance that the present invention can be applied to an arbitrary mobile terminal such as a tablet terminal, a PDA, etc.

A display 14 such as a liquid crystal, organic EL or the like, which functions as a display portion is provided on a main surface (top surface) of the housing 12. A touch panel 16 is provided on the display 14. Therefore, in the mobile phone 10 of this embodiment shown, the most of input operations except an operation through a hard key described later are performed through the touch panel 16.

A speaker 18 is housed in the housing 12 at one end of a longitudinal direction on a side of the top surface, and a microphone 20 is housed at the other end in the longitudinal direction on the side of the top surface.

As a hard key constituting an inputting portion together with the touch panel 16, in this embodiment, a call key 22a, an end key 22b and a menu key 22c are provided.

For example, the user can input a telephone number by making a touch operation on the touch panel 16 with respect to a dial key (not shown) displayed on the display 14, and start a telephone conversation by operating the call key 22a. If and when the end key 22b is operated, the telephone conversation can be ended. In addition, by long-depressing the end key 22b, it is possible to turn-on/-off a power of the mobile phone 10.

If the menu key 22c is operated, a menu screen is displayed on the display 14, and in such a state, by making a touch operation on the touch panel 16 against a soft key, a menu icon (both, not shown) or the like being displayed on the display 14, it is possible to select a menu, and to decide such a selection.

A lens aperture 24 for a first camera module 50 (FIG. 2) described later is provided at the one end of the longitudinal direction on the side of the top surface of the housing 12. Furthermore, a lens aperture 26 for a second camera module 52 is provided at the one end of the longitudinal direction on the side of the bottom surface of the housing 12. Therefore, the first camera module 50 or the second camera module 52 images an image through the lens aperture 24 or the lens aperture 26.

Figure 2:
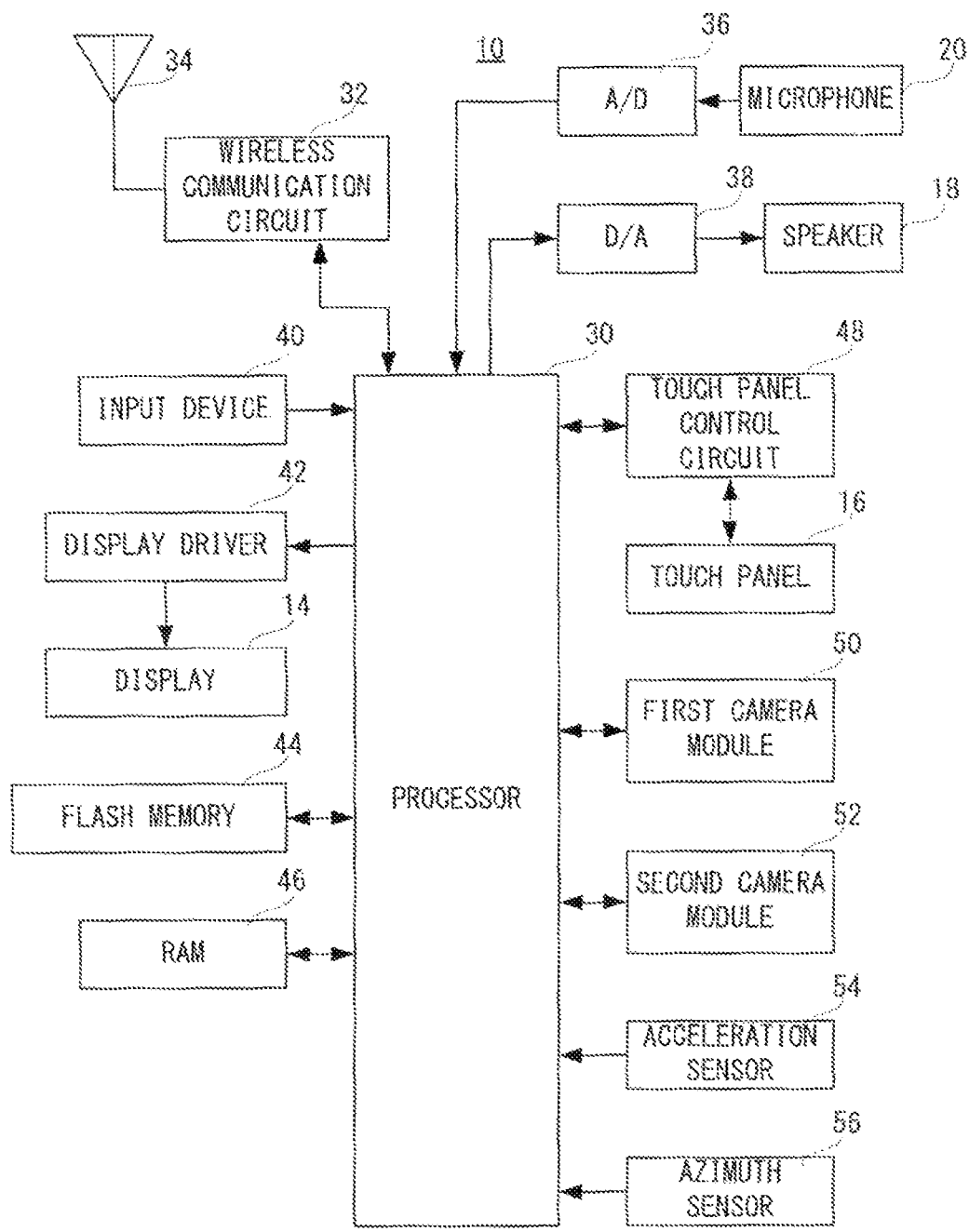
FIG. 2 is an illustrative view showing electrical structure of the mobile phone shown in FIG. 1.

With referring to FIG. 2, the mobile phone 10 of the embodiment shown in FIG. 1 includes a processor 30 called as a computer or a CPU. The processor 30 is connected with a wireless communication circuit 32, an A/D converter 36, a D/A converter 38, an input device 40, a display driver 42, a flash memory 44, a RAM 46, a touch panel control circuit 48, a first camera module 50, a second camera module 52, an acceleration sensor 54, an azimuth sensor 56, etc.

The processor 30 is in charge of a whole control of the mobile phone 10. All or a part of a program set in advance on the flash memory 44 is, in use, developed into the RAM 46, and the processor 30 operates in accordance with the program in the RAM 46. In addition, the RAM 46 is further used as a working area or buffer area for the processor 30.

The input device 40 includes the touch panel 16 shown in FIG. 1 and the hard keys 22a-22c, and constitutes an operating portion or an inputting portion. Information (key data) of the hard key operated by the user is input to the processor 30.

The wireless communication circuit 32 is a circuit for transmitting and receiving a radio wave for a telephone conversation, a mail, etc. via an antenna 34. In this embodiment, the wireless communication circuit 32 is a circuit for performing a wireless communication with a CDMA system. For example, if the user designates a telephone dispatch (telephone call) using the input device 40, the wireless communication circuit 32 performs a telephone call processing under instructions from the processor 30 and outputs a telephone call signal via the antenna 34. The telephone call signal is transmitted to a telephone at the other end of the line through a base station and a communication network. Then, an incoming processing is performed in the telephone at the other end of the line, a communication-capable state is established and the processor 30 performs the telephonic communication processing.

Specifically describing, a normal telephonic communication processing, a modulated sound signal sent from a telephone at the other end of the line is received by the antenna 34. The modulated sound signal received is subjected to a demodulation processing and a decode processing by the wireless communication circuit 32. A received sound signal obtained through such processing is converted into an analog sound signal by the D/A converter 38 to be output from the speaker 18. On the other hand, a sending sound signal taken-in through the microphone 20 is converted into sound data by the A/D converter 36 to be applied to the processor 30. The sound data is subjected to an encode processing and a modulation processing by the wireless communication circuit 32 under instructions by the processor 30 to be output via the antenna 34. Therefore, the modulated sound signal is transmitted to the telephone at the other end of the line via the base station and the communication network.

When the telephone call signal from a telephone at the other end of the line is received by the antenna 34, the wireless communication circuit 32 notifies the processor 30 of the incoming call. In response thereto, the processor 30 displays on the display 14 sender information (telephone number and so on) described in the incoming call notification by controlling the display driver 42. In addition, the processor 30 outputs from the speaker 18 a ringtone (may be also called as a ringtone melody, a ringtone voice).

Then, if the user performs a responding operation by using the call key 22a (FIG. 1), the wireless communication circuit 32 performs a processing for establishing a communication-capable state under instructions by the processor 30. Furthermore, when the communication-capable state is established, the processor 30 performs the above-described telephone communication processing.

If the telephone communication ending operation is performed by the end key 22b (FIG. 1) included in the input device 40 after a state is changed to the communication-capable state, the processor 30 transmits a telephone communication ending signal to the telephone at the other end of the line by controlling the wireless communication circuit 32. Then, after the transmission of the telephone communication ending signal, the processor 30 terminates the telephone communication processing. Furthermore, in a case that the telephone ending signal from the telephone at the other end of the line is previously received, the processor 30 also terminates the telephone communication processing. In addition, in a case that the telephone communication ending signal is received from the mobile communication network not from the telephone at the other end of the line, the processor 30 also terminates the telephone communication processing.

The microphone 20 shown in FIG. 1 is connected to the A/D converter 36, and as described above, a sound signal from the microphone 20 is input to the processor 30 as digital sound signal through the A/D converter 36. The speaker 18 is connected to the D/A converter 38. The D/A converter 38 converts a digital sound signal into an analog sound signal so as to apply to the speaker 18 via an amplifier. Therefore, a sound or voice of the sound data is output from the speaker 18.

In addition, the processor 30 adjusts, in response to an operation of a volume by the user, a sound volume of the sound output from the speaker 18 by controlling an amplification factor of the amplifier connected to the D/A converter 38.

The display driver 42 is connected with the display 14 shown in FIG. 1, and therefore, the display 14 displays an image or video in accordance with image or video data output from the processor 30. That is, the display driver 40 controls a displaying by the display 14 which is connected to the display driver 40 under instructions by the processor 30. In addition, the display driver 42 includes a video memory which temporarily stores the image or video data to be displayed. The display 14 is provided with a backlight which includes a light source of an LED or the like, for example, and the display driver 42 controls, according to the instructions of the processor 30, brightness, light-on/off of the backlight.

The touch panel 16 shown in FIG. 1 is connected to a touch panel control circuit 48. The touch panel control circuit 48 applies a necessary voltage, etc. to the touch panel 16, and inputs to the processor 30 a touch start signal indicating a start of a touch by the user, a touch end signal indicating an end of a touch by the user, and coordinates data indicating a touch position that the user touches. Therefore, the processor 30 can determine which icon or key is touched by the user based on the coordinates data.

In the embodiment, the touch panel 16 is of an electrostatic capacitance system that detects a change of an electrostatic capacitance between electrodes, which occurs when an object such as a finger is in close to a surface of the touch panel 16, and it is detected that one or more fingers is brought into contact with the touch panel 16, for example. In addition, the touch panel 16 is a pointing device which is provided on the display 14 and designates an arbitrary position within a screen of the display. The touch panel control circuit 48 functions as a detecting portion, and detects a touch operation within a touch-effective range of the touch panel 16, and outputs coordinates data indicative of a position of the touch operation to the processor 30. That is, the user can input an operating position, an operating direction and so on to the mobile phone 10 by touching, sliding and releasing on or from the surface of the touch panel 16.

In addition, for a detection system of the touch panel 16, a surface-type electrostatic capacitance system may be adopted, or a resistance film system, an ultrasonic system, an infrared ray system, an electromagnetic induction system or the like may be adopted. Furthermore, a touch operation is not limited to an operation by a finger, may be performed by a touch pen.

The first camera module 50 is called as a sub-camera or an in-camera, and includes a control circuit, a lens, an image sensor, etc. The first camera module 50 is provided such that a face of the user can be imaged. Therefore, if a TV phone function (video chat function) described later is performed, the first camera module 50 is activated. An image imaged by the first camera module 50 is transmitted to a terminal of the other end of the line.

The second camera module 52 is called as a main camera, and as similar to the first camera module 50, includes a control circuit, a lens, an image sensor, etc., each necessary to perform a camera function. The processor 30 activates the second camera module 52 when the camera function is performed, and displays a through image (preview image) corresponding to a background and an object on the display 14. The second camera module 52 performs processing for imaging an image if the user performs an imaging operation.

The acceleration sensor 54 is a 3-axis acceleration sensor of a semiconductor type, and may be called as a detecting portion. The acceleration sensor 54 outputs a 3-axis (X, Y, Z) acceleration data of the mobile phone 10 to the processor 30 which determines movement of the mobile phone 10 by detecting a change in the 3-axis acceleration data. Furthermore, the processor 30 can calculate an inclination angle of the mobile phone 10 by using a trigonometric function against a gravitational acceleration detected by the acceleration sensor 54. Then, the processor 30 may set a displaying direction of the display 14 based on the calculated inclination angle according to an operating state of the mobile phone 10.

The azimuth sensor 56 is called as an electronic compass or a rotation detecting portion, and includes three (3) terrestrial magnetism sensors and a control circuit which extracts terrestrial magnetism data from magnetism data detected by the three (3) terrestrial magnetism sensors and outputs the same to the processor 30. The processor 30 calculates azimuth angle (azimuth) data based on the terrestrial magnetism data output from the control circuit so as to store the same as a direction of the terminal in a buffer in the RAM 46. In additional, for each terrestrial magnetism sensor, a Hall device is utilized, but an MR (magnet-resistive) device or an MI (magnet-impedance) device may be used.

Furthermore, the mobile phone 10 is capable of performing a so-called handsfree conversation. Then, it is possible to perform a TV telephone function by utilizing the first camera module 50 (in-camera) and the handsfree conversation. For example, if a TV telephone function is performed, a conversation-capable state with the terminal of the other end of the line is established, and an image transmitted from the other end of the line is displayed on the display 14, and an image imaged by the first camera module 50 is transmitted to the terminal of the other end of the line. Then, the user performs the hands free conversation while seeing the other end of the line.

Figure 3:
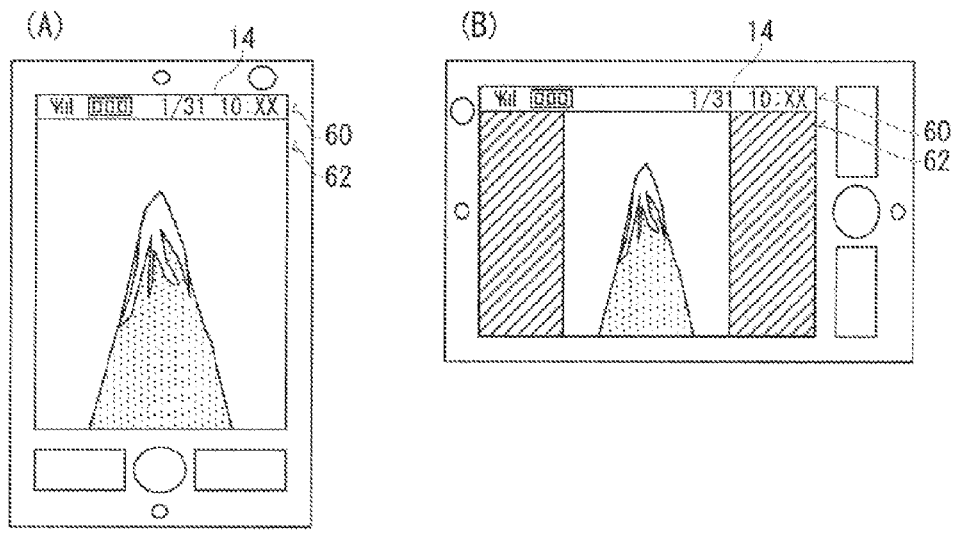

FIGS. 3(A) and 3(B) are illustrative views showing a state that an imaged image is being displayed on the display 14 of the mobile phone 10. A displaying range of the display 14 includes a status displaying area 60 and a function displaying area 62. With referring to FIGS. 3(A) and 3(B), in the status displaying area 60, an icon (picto) indicating a radiowave reception status by the antenna 34, an icon showing a residual battery capacity of a secondary battery and date and time are displayed. In the function displaying area 62, an image corresponding to the imaged image data stored in the flash memory 44 is displayed.

In a case that the imaged image is being displayed on the display 14, a posture that the mobile phone 10 is held, that is, the inclination angle is calculated by the processor 30 such that a displaying manner of the imaged image is changed. For example, if the mobile phone 10 is held vertically, the display 14 is also rendered in a vertical state with respect to the user, and therefore, an image is displayed as shown in FIG. 3(A). On the other hand, if the mobile phone 10 is held horizontally, the display 14 is also rendered in a horizontal state with respect to the user, and therefore, an image being rotated by 90 degrees is displayed as shown in FIG. 3(B). In addition, if an image is to be reduced in size, the image is reduced while an aspect ratio is not changed.

Figure 4:
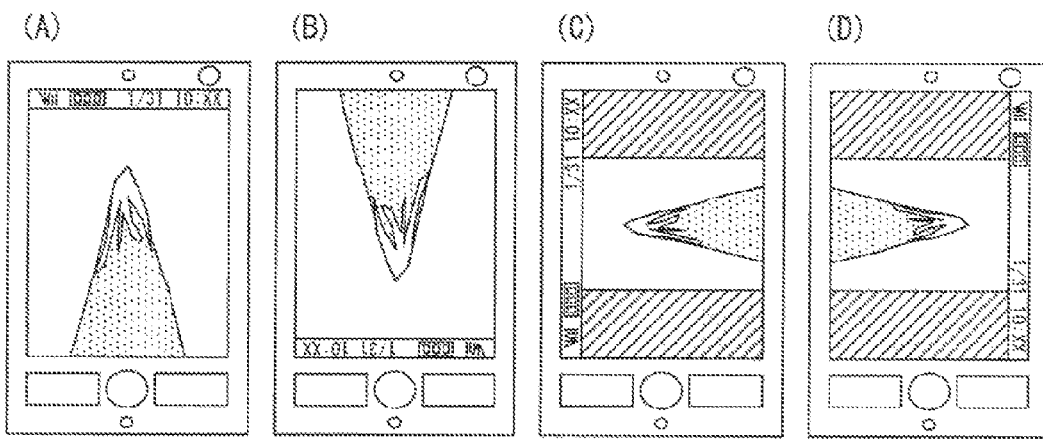

With referring to FIGS. 4(A)-4(D), a direction (displaying direction) in which content such as an image is displayed on the display 14 in relation to a state that the user normally utilizes the mobile phone 10, i.e. an inclination is shown. A state of FIG. 4(A) is a state very frequently utilized by the user and thus called as a normal state. Therefore, in this embodiment shown, a displaying direction of the display 14 in the normal state is called as a normal direction. With respect to the normal direction in the normal state, a displaying direction of FIG. 4(B) is called as a reverse direction, and a displaying direction of the FIG. 4(C) is called as a rightward direction, and a displaying direction of the FIG. 4(D) is called as a leftward direction.

If the displaying direction is changed, rotation processing and reduction processing and so on are made on the image to be displayed on the display 14 before displaying. In other embodiments, however, a displaying direction may be changed by changing a drawing start position of the display 14.

In a case that the mobile phone 10 is placed on a desk or the like flat and thus a horizontal posture or approximately horizontal posture is detected by the acceleration sensor 54, a direction that a face of the user exists cannot be identified by only an output of the acceleration sensor 54. Therefore, in such a case, there is a possibility that the displaying direction of the display 14 and the direction of the face of the user are not coincident with each other.

Therefore, in this embodiment shown, if and when the mobile phone 10 detects a horizontal posture or approximately horizontal posture based on the output of the acceleration sensor 54, a face of the user is detected from an imaged image output by the first camera module 50. Then, a displaying direction of the display 14 is set on the basis of the detected direction of the face and a position of the face in the imaged image. In addition, in this embodiment shown, a state of the mobile phone 10 that an inclination to a horizontal direction is equal to or less than 10 degrees is called as "approximately horizontal posture", but inclination rendering the mobile phone 10 in "an approximately horizontal posture" is not limited to 10 degrees or less, and a suitable angle value may be adopted.

First, the direction of the face of the user is detected based on a positional relationship between eyes and a mouth. Specifically, an area corresponding to a vertical direction area and a horizontal direction area each including the center of gravity of two eyes as a center thereof are set. If position of the mouth is included in a vertical direction area, the direction of the face is detected as a vertical direction. If the position of the mouth is included in a horizontal direction area, the direction of the face is detected as a horizontal direction.

Figure 5:
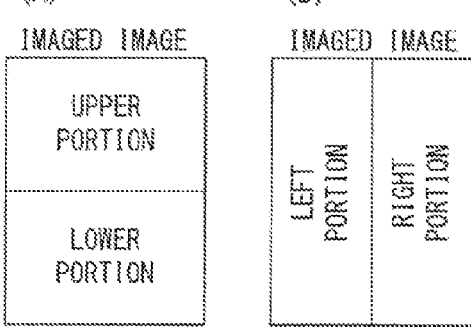

Next, with referring to FIGS. 5(A) and 5(B), an imaged image is divided into an upper portion and a lower portion or a left portion and a right portion. Then, if the direction of the face is the vertical direction, it is determined whether a position (the center of gravity) of the face of the user is included in the upper portion or the lower portion. If the direction of the face is the horizontal direction, it is determined whether the position (the center of gravity) of the face of the user is included in the left portion or the right portion.

In a case that the position of the face is included in the upper portion, the displaying direction is set in the reverse direction (FIG. 4(B)). In a case that the position of the face is included in the lower portion, the displaying direction is set in the normal direction (FIG. 4(A)). If the position of the face is included in the left portion, the displaying direction is set in the leftward direction (FIG. 4(D)). If the position of the face is included in the right portion, the displaying direction is set in the rightward direction (FIG. 4(C)).

With referring to FIG. 6(A), for example, if the mobile phone 10 is placed flat such that the mobile phone 10 is rendered in a state that the display 14 becomes vertical with respect to the user, the imaged image as shown in FIG. 6(B) is output from the first camera module 50. In the imaged image, it is determined that the direction of the face of the user is vertical, and that the position of the face is included in the lower portion. Therefore, the displaying direction of the display 14 becomes in the normal direction as shown in FIG. 4(A).

With referring to FIG. 7(A), for example, if the mobile phone 10 is placed flat such that the mobile phone 10 is rendered in a state that the display 14 becomes horizontal with respect to the user, the imaged image as shown in FIG. 7(B) is output from the first camera module 50. In the imaged image shown in FIG. 7(B), it is determined that the direction of the face of the user is horizontal, and that the position of the face is included in the right portion. Therefore, the displaying direction of the display 14 becomes in the rightward direction as shown in FIG. 4(C).

Although a detailed description is omitted here, if it is determined that the face of the user is included in the upper portion, the displaying direction is set in the reverse direction, and if included in the leftward portion, the displaying direction is set in the leftward direction.

Thus, in this embodiment shown, even if the user places the mobile phone 10 flat, the displaying direction of the display 14 is set to be fit for the position of the face of the user. Therefore, it is possible for the user to watch the displaying of the display 14 easily.

Furthermore, if a rotation is detected based on the azimuth angle data output by the azimuth sensor 56 in a state that the mobile phone 10 is placed flat (in the horizontal posture or approximately horizontal posture), the imaged image is output again by the first camera module 50. That is, if the rotation occurs in the horizontal or approximately horizontal posture, the position of the face of the user is changed, and therefore, the displaying direction of the display 14 is set again based on the re-output imaged image. Accordingly, even if the mobile phone 10 is rotated in the horizontal posture or the approximately horizontal posture, it is possible to correct the displaying direction of the display 14 so as to be coincident with the direction of the face of the use.

Furthermore, in a case that a predetermined time period (30 seconds, for example) elapses from a time that the displaying direction of the display 14 is set, the first camera module 50 re-outputs an imaged image. That is, since the position of the face of the user frequently changes, the face of the user is imaged at every predetermined time period so as to correspond to the changed position of the face of the user. Therefore, even if the position of the face of the user varies, the displaying direction can be suitably corrected.

Furthermore, in a case that faces of a plurality of persons are included in an imaged image, a person whose face is imaged at largest, i.e. a person nearest the mobile phone 10 is identified, and the displaying direction of the display 14 is set on the basis of the person. Therefore, even if the imaged image includes faces of a plurality of persons, the displaying direction of the display portion (display 14) can be set to be fit for a person who is most likely to watch the display 14.

If the first camera module 50 is activated in the horizontal posture, for example, the first camera module 50 is stopped after the image is imaged and then the face detection processing is completed. That is, a power for the first camera module 50 is turned-off at a time that it is unnecessary to detect a face of a user, and therefore, it is possible to suppress electricity consumption of the mobile phone 10.

In this embodiment shown, the displaying direction of the display 14 is determined by inversing right and left of the imaged image. A reason is that in explaining by using FIGS. 7(A) and 7(B), the imaged image which is inversed right and left is easy to understand this embodiment shown. For example, if the imaged image is not inversed right and left, in the imaged image of FIG. 7(B), the user is positioned at a left side, and therefore, it seems that the position of the face of the user in the imaged image and the position of the user to the mobile phone 10 do not correspond to each other. Therefore, in this embodiment shown, a description is made by inversing right and left of the imaged image, however, in other embodiments, in order to make processing simple, the displaying direction may be set without inversing right and left of the imaged image.

Features of the embodiment shown are outlined in the above, but in the following, this embodiment will be described in detail by using a memory map of the RAM 46 of the mobile phone 10 shown in FIG. 8 and flowcharts for the processor 30 of the mobile phone 10 shown in FIG. 9, FIG. 10 and FIG. 11.

Figure 8:
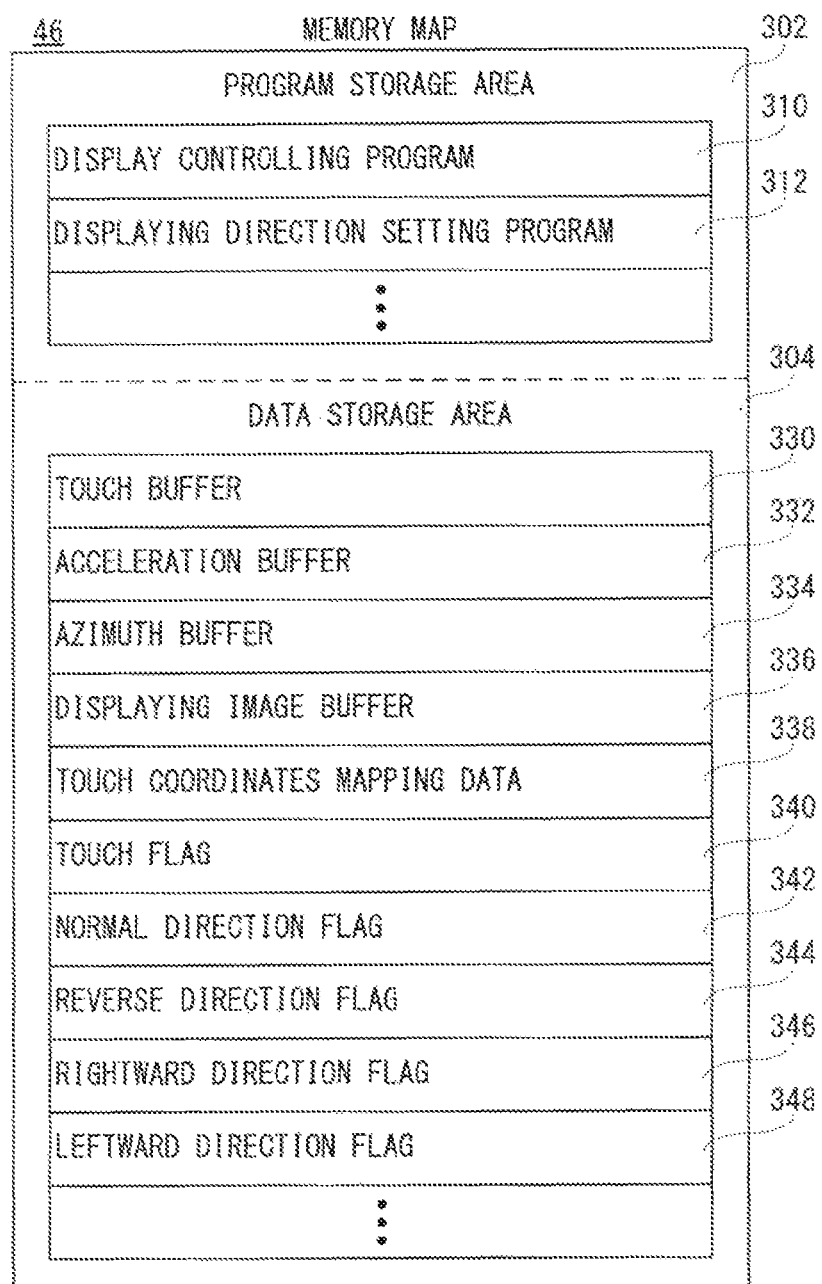
FIG. 8 is an illustrative view showing an example of a memory map of a RAM shown in FIG. 2.

With referring to FIG. 8, in the RAM 46 shown in FIG. 2, a program storage area 302 and a data storage area 304 are formed. The program storage area 302 is an area for storing (developing) a part or all of the program data set in advance in the flash memory 44 (FIG. 2) by reading the same from the flash memory 44 as aforementioned.

The program storage area 302 includes a display controlling program 310 for controlling a displaying on the display 14, a displaying direction setting program 312 for setting a displaying direction, etc. In addition, the program storage area 302 also includes programs for performing a telephone function, an answering machine function, a mailing function, etc.

Next, the data storage area 304 of the RAM 46 is formed with a touch buffer 330, an acceleration buffer 332, an azimuth buffer 334 and a displaying image buffer 336, and stored with a touch coordinates map data 338. In the data storage area 304, a touch flag 334, a normal direction flag 342, a reverse direction flag 344, a rightward direction flag 346 and a leftward direction flag 348 are also provided.

The touch buffer 330 is stored with data of touch coordinates that the touch panel control circuit 48 outputs. The acceleration buffer 332 temporarily stores acceleration data output from the acceleration sensor 54. The azimuth buffer 334 temporarily stores azimuth angle data output from the azimuth sensor 56. In the displaying image buffer 336, image data to be displayed on the display 14 is temporarily stored. In addition, in a case that the displaying direction varies, the image data stored in the displaying image buffer 336 is subjected to rotation processing, enlargement/reduction processing, etc.

The touch coordinates map data 338 is data for mapping touch coordinates by a touch operation and displaying coordinates on the display 14. That is, a result of the touch operation performed against the touch panel 16 is reflected in the displaying on the display 14 based on the touch coordinates map data 338.

The touch flag 340 is a flag for determining whether or not the touch panel 16 is touched. For example, the touch flag 340 is constructed by a 1-bit register. If the touch flag 340 is turned-on (truth), a data value "1" is set in the register, and if the touch flag 340 is turned-off (false), a data value "0" is set in the register. The touch flag 340 is switched between turning-on and turning-off based on a signal that the touch panel control circuit 48 outputs.

The normal direction flag 342 is a flag for determining whether or not the displaying direction of the display 14 is set in the normal direction. The reverse direction flag 344 is a flag for determining whether or not the displaying direction of the display 14 is set in the reverse direction. The rightward direction flag 346 is a flag for determining whether or not the displaying direction of the display 14 is set in the rightward direction. The leftward direction flag 348 is a flag for determining whether or not the displaying direction of the display 14 is set in the leftward direction. Then, structure of each of these flags is approximately the same as the touch flag 340, and therefore, a detailed description of each of the flags will be omitted here.

In addition, the data storage area 304 further stores image data displayed in a standby state, data of character strings and so on, and is provided with counters and flags necessary for operating the mobile phone 10.

Figure 9:
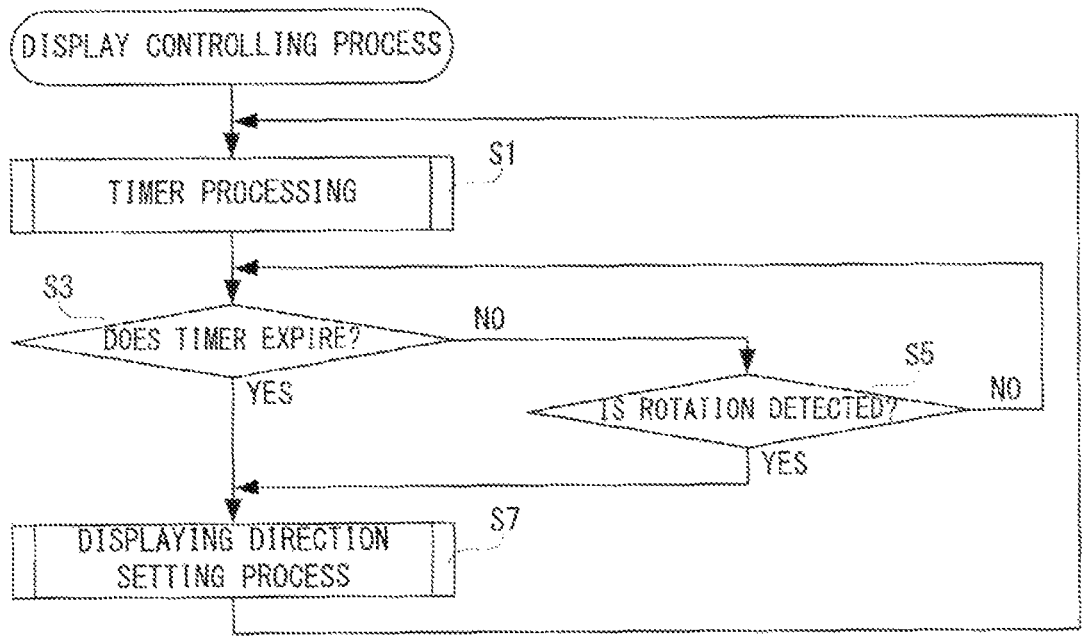
FIG. 9 is a flowchart showing an example of a displaying controlling process by a processor shown in FIG. 2.
Figure 10:
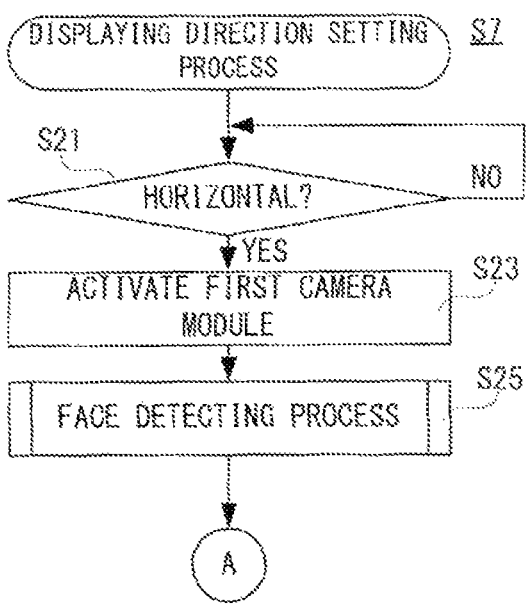
FIG. 10 is a flowchart showing an example of a part of a displaying direction setting process by the processor shown in FIG. 2.
Figure 11:
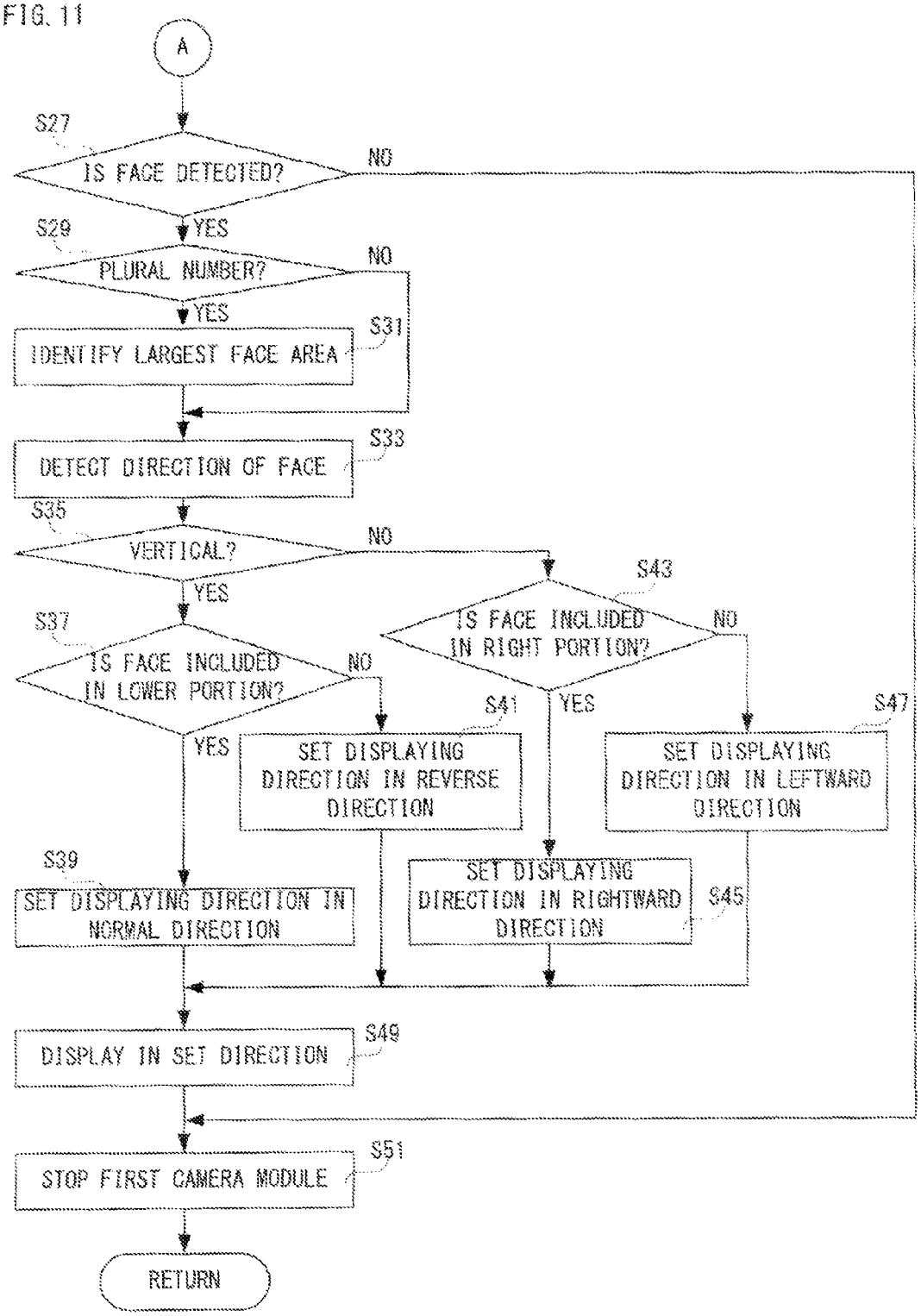
FIG. 11 is a flowchart showing an example of another part of the displaying direction setting process by the processor shown in FIG. 2, following FIG. 10.

The processor 30 processes a plurality of tasks including a displaying controlling process shown in FIG. 9, a displaying direction determining process shown in FIGS. 10 and 11, etc., in parallel with each other under controls of Linux (registered trademark)-base OS such as Android (registered trademark) and REX, or other OSs.

The display controlling process is started when a power of the display 14 is turned-on, for example. In a step S1, the processor 30 performs timer processing. That is, a counter for counting (measuring) a predetermined time period is reset so as to start a counting of the predetermined time period. Subsequently, the processor 30 determines whether or not the timer has expired in the step S3. That is, it is determined whether or not the measurement of the predetermined time period is ended. If "NO" is determined in the step S3, that is, if the predetermined time period does not elapse from the start of the measurement thereof, it is determined in a step S5, whether or not rotation is detected. That is, it is determined whether or not the azimuth angle data stored in the azimuth buffer 334 varies. If "NO" is determined in the step S5, that is, if no rotation is detected, the process returns to the step S3.

Then, if the predetermined time period elapses and thus "YES" is determined in the step S3, in a step S7, the processor 30 performs the displaying direction setting process. If the mobile phone 10 is in the horizontal posture or approximately horizontal posture, the displaying direction setting process is performed at every predetermined time period, and the first camera module 50 is activated. In addition, if the rotation is detected and thus "YES" is determined in the step S5, the displaying direction setting process is also performed. If the rotation is detected in the horizontal or approximately horizontal posture, for example, the displaying direction setting process is performed and the first camera module 50 is activated. In addition, if the processing in the step S7 is ended, the process returns to the step S1.

FIG. 10 is a flowchart showing the displaying direction setting process. In performing the displaying direction setting process, the processor 30 determines whether or not the mobile phone 10 is in the horizontal or approximately horizontal posture in a step S21, that is, based on the acceleration data stored in the acceleration buffer 332, it is determined whether or not the mobile phone 10 is in the horizontal posture or approximately horizontal posture. If "NO" is determined in the step S21, that is, if the mobile phone 10 is held by the user in a manner that the mobile phone 10 is inclined, for example, the processor 30 repeats the processing in the step S21.

If "YES" is determined in the step S21, that is, if the mobile phone 10 is placed flat on the desk such that the mobile phone 10 becomes in the horizontal posture or approximately horizontal posture, the processor 30 activates the first camera module 50 in a step S23. In order to image the face of the user, the first camera module 50 is activated. Subsequently, a face detection processing is performed in a step S25. For example, a face of the user is imaged by the first camera module 50 being activated, and from an imaged image output from the first camera module 50, a region including eyes, mouth and so on is detected as a face. In addition, the processor 30 performing the processing in the step S23 functions as an activating portion, and the processor 30 performing the processing in the step S25 functions a performing portion.

With referring to FIG. 11, in a step S27, the processor 30 determines whether or not a face is detected. That is, it is determined whether or not the face is detected by the face detection processing. If "NO" is determined in the step S27, that is, if no face is detected, the processor 30 proceeds to a step S51. On the other hand, if "YES" is determined in the step S27, that is, if the face is detected, in a step S29, the processor 30 determines whether or not a plurality of faces are detected. That is, it is determined whether or not faces of a plurality of persons are included in the imaged image.

If "NO" is determined in the step S29, that is, if the number of the faces detected from the imaged image is one (1), the processor 30 proceeds to a step S33. If "YES" is determined in the step S29, if three (3) faces are detected, for example, in a step S31, the processor 30 identifies the largest face region. That is, a face of a person nearest the mobile phone 10 is identified. For example, by evaluating an area of a region including eyes and mouth, the largest face region is identified. In addition, the processor 30 performing the processing in the step S31 functions as an identifying portion.

Subsequently, a direction of the face is detected in the step S33. That is, based on a positional relationship between eyes and a mouth in the face region, it is determined the direction of the face is a vertical direction or a horizontal direction. In addition, the processor 30 performing the processing of the step S33 functions as a direction detecting portion.

Next, in a step S35, it is determined whether or not the direction of the face is the vertical direction. If "YES" is determined in the step S35, that is, if the face of the user is imaged in the vertical direction as shown in FIG. 6(B), for example, the processor 30 determines in a step S37, whether or not the face is included in the lower portion. That is, the processor 30 determines whether or not the detected face is included in the lower portion shown in FIG. 5(A). If "YES" is determined in the step S37, that is, if the face of the user in the vertical direction is included in the lower portion as shown in FIG. 6(B), the processor 30 sets the displaying direction in the normal direction in a step S39, and the process proceeds to a step S49 so as to turn-on the normal direction flag 342 such that the displaying direction is rendered in a state of FIG. 4(A). On the other hand, if "NO" is determined in the step S37, that is, the face of the user in the vertical direction is included in the upper portion, the processor 30 sets the displaying direction in the reverse direction in the step S41, and the process proceeds to the step S49 so as to turn-on the reverse direction flag 344 such that the displaying direction is rendered in a state of FIG. 4(B).

If "NO" is determined in the step S35, that is, if the face of the user is imaged in the horizontal direction as shown in FIG. 7(B), for example, in a step S43, the processor 30 determines whether or not the face is included in the right portion. That is, the processor 30 determines whether or not the detected face is included in the right portion shown in FIG. 5(B). If "YES" is determined in the step S43, that is, if the face of the user in the horizontal direction is included in the right portion as shown in FIG. 7(B), for example, the processor 30 sets the displaying direction in the rightward direction, and the process proceeds to the step S49 so as to turn-on the rightward direction flag 346 such that the displaying direction is rendered in a state of FIG. 4(C). On the other hand, if "NO" is determined in the step S43, that is, if the face is included in the left portion, the processor 30 sets the displaying direction in the leftward direction in a step S47, and the process proceeds to the step S49 so as to turn-on the leftward direction flag 348 such that the displaying direction is rendered in a state of FIG. 4(D).

In addition, the processor 30 performing the processing in the step S39, S41, S45, or S47 functions as a setting portion.

Subsequently, in the step S49, the processor 30 displays a content in the displaying direction previously set. For example, if the rightward direction flag 346 out of the normal direction flag 342, the reverse direction flag 344, the rightward direction flag 346 and the leftward direction flag 348 is turned-on, the image stored in the displaying image buffer 336 is subjected to the rotation processing and the size-reduction processing, whereby an image in the rightward direction can be displayed on the display 14. In addition, the processor 30 performing the processing in the step S49 functions as a displaying processing portion.

Next, the processor 30 stops the first camera module 50 in a step S51. That is, the power of the first camera module 50 is turned-off. Then, if the processing in the step S51 is ended, the processor 30 terminates the displaying direction setting process and returns to the displaying controlling process. In addition, the processor 30 performing the processing of the step S51 functions as a stopping portion.

Second Embodiment

In the second embodiment, a direction of a face of the user is evaluated by an angle based upon which a displaying direction of the display 14 is decided. Since a mobile phone 10 of the second embodiment is the same as or similar to that of the first embodiment, descriptions for the electrical structure and apparatus of the mobile phone 10 and the memory map of the RAM 46, the displaying controlling process shown in FIG. 9 are omitted here.

Figure 12:
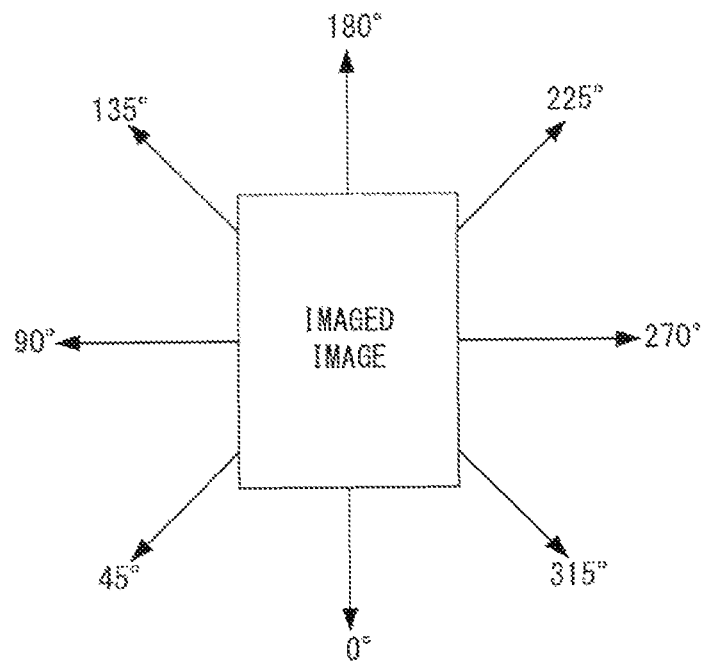
FIG. 12 is an illustrative view showing an example of a direction set in an imaged image output from the first camera module shown in FIG. 2.

With referring to FIG. 12, in the imaged image output from the first camera module 50, angles that become larger in a clockwise direction with the reference (0 degrees) at a downward direction are set. That is, the downward direction is 0 degrees, a leftward direction is 90 degrees, and an upward direction is 180 degrees, and the rightward direction is 270 degrees.

Then, if an angle θ (theta) of the face is included in a range of "0 degrees≤θ<45 degrees" or "315 degrees≤θ<360 degrees", the displaying direction is set in the normal direction. If an angle θ of the face is included in a range of "45 degrees≤θ<135 degrees", the displaying direction is set in the leftward direction. If an angle θ of the face is included in a range of "135 degrees≤θ<225 degrees", the displaying direction is set in the reverse direction. And, if an angle θ of the face is included in a range of "225 degrees≤θ<315 degrees", the displaying direction is set in the rightward direction.

Figure 13:
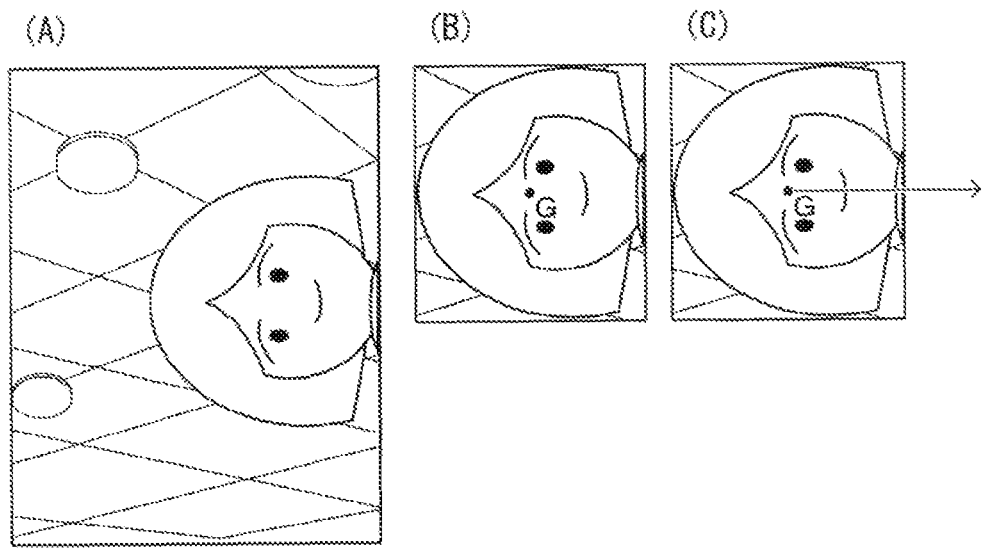

Next, the angle θ of the face can be evaluated based on a relationship between the center of gravity G of an extracted image that a face region is extracted from the imaged image and a mouth of the use. For example, the face region as shown in FIG. 13(B) is extracted from the imaged image that the face of the user is imaged as shown in FIG. 13(A), and the center of gravity G is evaluated in the extracted image. Then, as shown in FIG. 13(C), a direction indicated by a line passing through the center of gravity G and a center point of the mouth becomes the angle θ of the face, i.e., a direction of the face. The angle of the face shown in FIG. 13(A) is detected as "270 degrees", and therefore, as described above, the displaying direction is set in the rightward direction.

In addition, in other embodiments, the angle θ of the face may be detected by utilizing an angle formed by a line segment connecting the coordinates of the two eyes to each other and a line in the horizontal direction.

FIG. 14 is a flowchart of a part of the displaying direction setting process according to the second embodiment. Since the processing in the steps S1-S31 and the steps S49-S51 are the same as those of the displaying direction setting process according to the first embodiment, an illustration and a description for these steps are omitted here.

In the displaying direction setting process according to the second embodiment, if the processing in the step S31 is ended, the processor 30 detects a direction of the face in the step S33. For example, as shown in FIGS. 13(A)-13(C), a face region is extracted from the imaged image, and the face angle θ is calculated based on the center of gravity G in the extracted image and the mouth of the user. Subsequently, in a step S61, the processor 30 determines whether or not the direction of the face θ is included within a range of the normal direction. That is, the processor 30 determines whether the face angle θ is included in "0 degrees≤θ<45 degrees" or "315 degrees≤θ<360 degrees". If "YES" is determined in the step S61, that is, if the angle θ of the face is 0 degrees, for example, the processor 30 sets the displaying direction in the normal direction in the step S39, and the process proceeds to the step S49.

On the other hand, if "NO" is determined in the step S61, that is, if the direction of the face is not included in the range of the normal direction, in a step S63, the processor 30 determines whether or not the direction of the face is included in a range of the reverse direction. That is, the processor 30 determines whether or not the face angle θ is included in the range of "135 degrees≤θ<225 degrees". If "YES" is determined in the step S63, that is, if the face angle θ is 180 degrees, for example, the processor 30 sets the displaying direction in the reverse direction in the step S41, and the process proceeds to the step S49.

If "NO" is determined in the step S63, that is, if the direction of the face is not included in the range of the reverse direction, in a step S65, the processor 30 determines whether or not the direction of the face is included in a range of the rightward direction. That is, the processor 30 determines whether or not the face angle θ is included in the range of "225 degrees≤θ<315 degrees". If "YES" is determined in the step S65, that is, if the face angle θ is 270 degrees, for example, the processor 30 sets the displaying direction in the rightward direction in the step S45, and the process proceeds to the step S49.

Then, if "NO" is determined in the step S65, that is, if the face angle θ is included in a range of the leftward direction ("45 degrees≤θ<135 degrees"), the processor 30 sets the displaying direction in the leftward direction in the step S47, and the process proceeds to the step S49.

In addition, in other embodiments, the direction of the face may be detected by utilizing template images of the face corresponding to the respective directions.

Furthermore, in this embodiment shown, a description is made on the assumption that a content displayed on the display 14 is a still image, but in other embodiments, various contents such as a moving image, a TV image, a website or web page, etc. may be displayed on the display 14. The displaying direction can be changed even if an arbitrary content is being displayed.

Furthermore, instead of the acceleration sensor 54 and the azimuth sensor 56, a posture and rotation of the mobile phone 10 may be detected by a gyro sensor or the like.

Programs utilized in the above-described embodiments may be stored in a HDD of the server for data distribution, and distributed to the mobile phone 10 via the network. The plurality of programs may be stored in a storage medium such as an optical disk of CD, DVD, BD (Blu-ray Disc) or the like, a USB memory, a memory card, etc. and then, such the storage medium may be sold or distributed. In a case that the plurality of programs downloaded via the above-described server or storage medium are installed to a mobile phone having the structure equal to the structure of the embodiment, it is possible to obtain advantages equal to advantages according to the embodiment.

The specific numerical values mentioned in this specification are only examples, and changeable properly in accordance with the change of product specifications.

An embodiment according to the present invention is a mobile terminal having a display portion which displays a content and a detecting portion which detects a posture of the mobile terminal, and a displaying direction of the display portion is changed according to an inclination of the mobile terminal detected by the detecting portion, comprising: a camera module which outputs an imaged image; an activating portion which activates the camera module when a horizontal posture or approximately horizontal posture of the mobile terminal is detected by the detecting portion; a performing portion which performs face detection processing through which a face is detected from the imaged image output from the camera module being activated by the activating portion; a direction detecting portion which detects a direction of the face detected through the face detection processing; a setting portion which sets a displaying direction of the display portion based on the direction of the face detected by the direction detecting portion; and a displaying processing portion which displays a content on the display portion in accordance with the displaying direction set by the setting portion.

In the embodiment, a mobile terminal (10: reference numeral exemplifying a portion corresponding in the embodiment, and so forth.) includes a display portion (14) which is also called as a display apparatus, and displays a content such as an image, website or web page, etc. A detecting portion includes a posture sensor or the like, and detects a posture of the mobile terminal by utilizing an acceleration, for example. Then, if an inclination of the mobile terminal is detected by the detecting portion, a displaying direction of the display portion varies. A camera module (50) is called as an in-camera, and outputs an imaged image. An activating portion (30, S23) activates the camera module by turning a power thereof on if and when the mobile terminal becomes in a horizontal posture or approximately horizontal posture, for example. A performing portion (30, S25) performs a detection processing for detecting a face from an imaged image that is imaged and output by the camera module being activated by the activating portion, with utilizing eyes, mouth and so on of a user. A direction detecting portion (30, S33) detects a direction of the face by utilizing the detected position of the mouth of the face, for example. A setting portion (30, S39, S41, S45, S47) sets the displaying direction of the display portion based on the direction of the face included in the imaged image. A displaying processing portion (30, S49) displays the content such as an image, website or web page, etc. on the display portion.

According to the embodiment, even if the user places the mobile terminal flat, a displaying direction of the display portion can be set to be adapted to the position of the face of the user, and therefore, it is possible to make easy to see the displaying of the display portion.

Another embodiment is a mobile terminal further comprising a rotation detecting portion which detects a rotation of the mobile terminal, wherein the activating portion activates the camera module when the rotation is detected by the rotation detecting portion in a state that the horizontal posture or approximately horizontal posture is being detected by the detecting portion.

In the embodiment, the rotation detecting portion (56) detects the rotation of the mobile terminal by utilizing an azimuth, for example. If the mobile terminal is rotated in the horizontal posture or approximately horizontal posture, the activating portion activates the camera module.

According to the embodiment, even if the mobile terminal is rotated in the horizontal posture or approximately horizontal posture, the displaying direction of the display portion can be corrected so as to be coincident with the direction of the face of the user.

A further embodiment is a mobile terminal, wherein the activating portion activates the camera module at every predetermined time period if the horizontal posture or approximately horizontal posture of the mobile terminal is being detected by the detecting portion.

According to the further embodiment, even if the position of the user is changed, it is possible to suitably correct the displaying direction.

A still further embodiment is a mobile terminal further comprising a stopping portion which stops the camera module after the face detection processing is performed.

In the still further embodiment, the stopping portion (30, S51) stops the camera module by turning the power thereof off after the face detection processing is performed.

According to the still further embodiment, it is possible to suppress the electricity consumption of the mobile terminal.

A still another embodiment is a mobile terminal further comprising an identifying portion which identifies a largest face when a plurality of faces are detected through the face detection processing, wherein the direction detecting portion detects a direction of the face identified by the identifying portion.

In this embodiment, the identifying portion (30, S31) identifies a face which most greatly comes out. Then, the direction detecting portion detects a direction of the face which most greatly comes out.

According to this embodiment, even if a plurality of persons are included in the imaged image, it is possible to set the displaying direction of the display portion so as to fit to a person most likely to watch the display portion.

The other embodiment according to the present invention is a controlling method of a displaying direction in a mobile terminal (10) having a display portion (14) which displays a content, a detecting portion (54) which detects a posture of the mobile terminal and a camera module (50) which outputs an imaged image, and a displaying direction of the display portion is changed according to an inclination of the mobile terminal detected by the detecting portion, comprising steps of: activating (S23) the camera module when a horizontal posture or approximately horizontal posture of the mobile terminal is detected by the detecting portion; performing (S25) face detection processing through which a face is detected from the imaged image output from the camera module being activated; detecting (S33) direction of the face detected through the face detection processing; and setting (S39, S41, S45, S47) a displaying direction of the display portion based on the direction of the face being detected.

According to the other embodiment, even if the user places the mobile terminal flat, a displaying direction of the display portion can be set to be adapted to the position of the face of the user, and therefore, it is possible to make easy to see the displaying of the display portion.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile terminal comprising:
   a display on a front surface of the mobile terminal;
   a detecting portion which detects a posture of the mobile terminal;
   a camera on the front surface of the mobile terminal which captures an image; and
   one or more modules that, when a horizontal posture or approximately horizontal posture of the mobile terminal is detected by the detecting portion, perform display control processing comprising
   activating the camera to capture an image of a user of the mobile terminal,
   detecting a face of the user from the captured image of the user,
   detecting a direction of the face of the user,
   setting a display direction based on the direction of the face of the user, and
   displaying a content on the display in accordance with the display direction.

2. A mobile terminal according to claim 1, further comprising a rotation detecting portion which detects a rotation of the mobile terminal, wherein the one or more modules, while the horizontal posture or approximately horizontal posture of the mobile terminal is detected by the detecting portion, performs the display control processing whenever rotation is detected by the rotation detecting portion.

3. A mobile terminal according to claim 1, wherein the one or more modules, while the horizontal posture or approximately horizontal posture of the mobile terminal is detected by the detecting portion, performs the display control processing after each of one or more predetermined time periods.

4. A mobile terminal according to claim 1, wherein the one or more modules deactivate the camera after performing the display control processing.

5. A mobile terminal according to claim 1, wherein, when a plurality of faces are detected in the captured image of the user, detecting a face of the user from the captured image of the user comprises identifying a largest face from among the plurality of faces.

6. A mobile terminal according to claim 1, wherein detecting a direction of the face of the user comprises:
determining if the face of the user is vertical or horizontal;
if it is determined that the face of the user is vertical,
detecting that the direction is a normal direction if the face of the user is in a lower portion of the captured image, and
detecting that the direction is a reverse direction if the face of the user is in an upper portion of the captured image; and,
if it is determined that the face of the user is horizontal,
detecting that the direction is a rightward direction if the face of the user is in a right portion of the captured image, and
detecting that the direction is a leftward direction if the face of the user is in a left portion of the captured image.

7. A mobile terminal according to claim 1, wherein detecting a direction of the face of the user comprises:
determining an angle of the face of the user based on a center of gravity and feature of the face; and
determining the direction of the face of the user based on the determined angle of the face.

8. A mobile terminal according to claim 7, wherein determining a direction of the face based on the determined angle of the face comprises:
determining that the direction of the face is normal when the determined angle is within a first range of angle values;
determining that the direction of the face is reverse when the determined angle is within a second range of angle values;
determining that the direction of the face is rightward when the determined angle is within a third range of angle values; and
determining that the direction of the face is leftward when the determined angle is within a fourth range of angle values.

9. A mobile terminal according to claim 1, wherein the detecting portion comprises an acceleration sensor.

10. A mobile terminal according to claim 2, wherein the rotation detecting portion comprises an azimuth sensor.

11. A mobile terminal according to claim 1, wherein the content displayed on the display includes no image that is captured by the camera.

12. A display control method in a mobile terminal having a display on a front surface of the mobile terminal, a detecting portion which detects a posture of the mobile terminal, and a camera on the front surface of the mobile terminal which captures an image, the method comprising, when a horizontal posture or approximately horizontal posture of the mobile terminal is detected by the detecting portion, performing display control steps of:
activating the camera to capture an image of a user of the mobile terminal;
detecting a face of the user from the captured image of the user;
detecting a direction of the face of the user; and
setting a display direction for content displayed on the display based on the direction of the face of the user.

13. A method according to claim 12, wherein the mobile terminal also has a rotation detecting portion which detects a rotation of the mobile terminal, and wherein the method further comprises performing the display control steps whenever rotation of the mobile terminal is detected by the rotation detecting portion while the horizontal posture or approximately horizontal posture of the mobile terminal is detected by the detecting portion.

14. A method according to claim 12, wherein the mobile terminal also has a rotation detecting portion which detects a rotation of the mobile terminal, and wherein the method further comprises performing the display control steps after each of one or more predetermined time periods while the horizontal posture or approximately horizontal posture of the mobile terminal is detected by the detecting portion.

15. A method according to claim 12, wherein, when a plurality of faces are detected in the captured image of the user, detecting a face of the user from the captured image of the user comprises identifying a largest face from among the plurality of faces.

16. A method according to claim 12, wherein detecting a direction of the face of the user comprises:
determining if the face of the user is vertical or horizontal;
if it is determined that the face of the user is vertical,
detecting that the direction is a normal direction if the face of the user is in a lower portion of the captured image, and
detecting that the direction is a reverse direction if the face of the user is in an upper portion of the captured image; and,
if it is determined that the face of the user is horizontal,
detecting that the direction is a rightward direction if the face of the user is in a right portion of the captured image, and
detecting that the direction is a leftward direction if the face of the user is in a left portion of the captured image.

17. A method according to claim 12, wherein detecting a direction of the face of the user comprises:
determining an angle of the face of the user based on a center of gravity and feature of the face; and
determining the direction of the face of the user based on the determined angle of the face.

18. A method according to claim 17, wherein determining a direction of the face based on the determined angle of the face comprises:
determining that the direction of the face is normal when the determined angle is within a first range of angle values;
determining that the direction of the face is reverse when the determined angle is within a second range of angle values;
determining that the direction of the face is rightward when the determined angle is within a third range of angle values; and
determining that the direction of the face is leftward when the determined angle is within a fourth range of angle values.

19. A display control method according to claim 12, wherein the content displayed on the display includes no image that is captured by the camera.

* * * * *